Aug. 25, 1925.

G. A. GEFFROY

HARROW

Filed May 19, 1924

1,550,956

Inventor:
Georges Auguste Geffroy

Patented Aug. 25, 1925.

1,550,956

UNITED STATES PATENT OFFICE.

GEORGES AUGUSTE GEFFROY, OF FAVEROLLES, FRANCE.

HARROW.

Application filed May 19, 1924. Serial No. 714,425.

*To all whom it may concern:*

Be it known that I, GEORGES AUGUSTE GEFFROY, citizen of the Republic of France, residing at Faverolles, Eure and Loir, France, have invented certain new and useful Improvements in Harrows, of which the following is a specification.

The ordinary harrows dragged over soil do not perform satisfactory work because their rigid frames do not allow all teeth to bear equally and to accommodate themselves to the unevenness of the ground. Furthermore, the harrow jumps or raises, some teeth penetrate insufficiently or too deeply, and the bottoms of the furrows are not reached.

Besides, such harrows are not easily handled; they must be dismounted for transportation and they have to be mounted again for work; the driver must walk behind the machine and frequently stop in order to clean the teeth.

The present invention has for its object to overcome the said drawbacks and it involves an improved harrow with supporting wheels and a seat for the driver. The teeth are formed on beams of suitable shape, separately pivoted on a cylindrical cross-bar rigidly related to the axle. These beams are at will raised or lowered together by means of a mechanism, the actuating element of which is within the reach of the driver.

Figure 1:
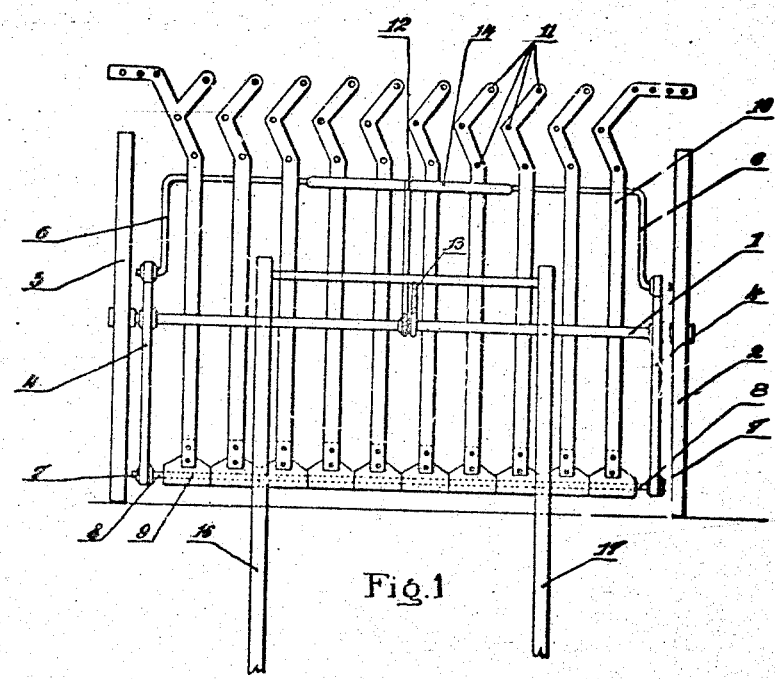
Fig. 1 is a plan-view of the harrow.

On a square axle 1 supported by wheels 2 and 3, stationary arms 4 of malleable cast-iron are mounted, the said axle passing through square apertures in the arms. These arms are lower at their front ends than the axle 1, and in said ends apertures 7 are formed, which an iron cross-bar 8 passes through. On this bar are pivoted the heads 9 integral with beams 10 bearing teeth 11; the rear end of each beam is S-shaped, so that a suitable interval exists between the teeth. As these beams are inclined in their working position, the teeth are of different lengths, and they are suitably inclined so as to bear equally and to penetrate easily into the earth.

At the upper end of the arms 4 a flat iron bar 6 in the form of a yoke is pivoted, said bar passing under the beams 10 and being connected by a second yoke 14 (inverted relatively to yoke 6) with the rearwardly-extending lower arm of a bell-crank actuating lever 12 pivoted at its apex to the center of a notched sector 13 rigidly secured to the axle 1. This lever 12 is located near the seat of the driver.

Finally the harrow is provided with shafts 16 and 17 between which a horse is put in.

Figures 2, 3:
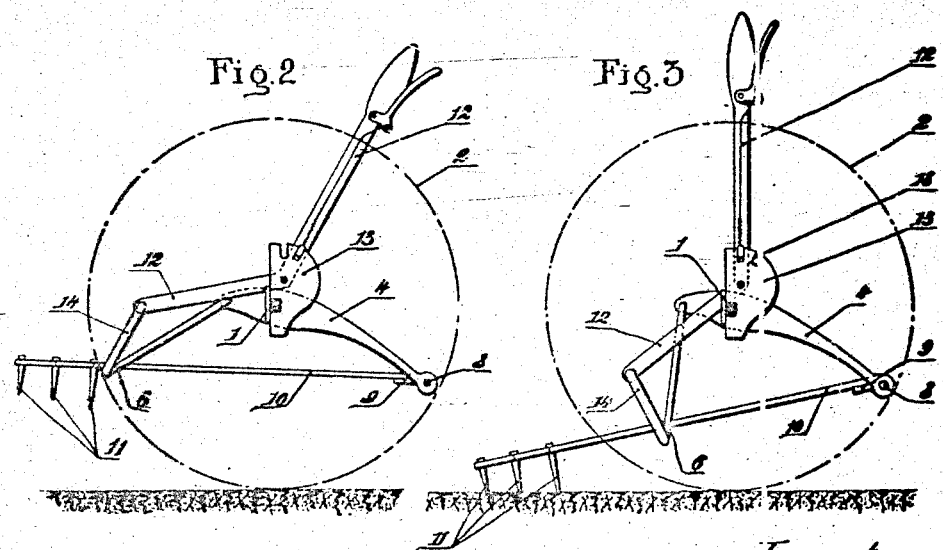
Figs. 2 and 3 are side-views showing the harrow in traveling and working position respectively.

Fig. 2 shows the harrow in its traveling position, all the tooth-carrying beams 10 being raised and maintained in this position and the actuating lever 12 being locked in the notch 18 of the sector 13. When the driver wishes to bring the harrow into working position, he moves the lever 12 from the position shown in Fig. 2 to that of Fig. 3, owing to which motion of the lever, the yoke 6 is lowered and all the tooth-carrying beams are allowed to drop into a position in which they rest freely on the soil.

During the harrowing operation the beams 10 being separately pivoted, swing up and down according to the irregularities of the ground. As the teeth work with their tapering points directed forward, they enter easily into the soil and the harrowing is uniform and very close.

The harrow in conformity with the invention affords practical advantages in comparison with the types generally used. In particular, as it is supported by wheels and provided with shafts, it is always ready for use; a simple manipulation of the lever 12 allows the harrow beams to pass from the raised or traveling position to the working position without any waste of time.

Besides when the harrow is choked up by weeds, it is not necessary to stop and to clean the teeth by hand as in the ordinary harrows. In fact the lever 12, actuated by the driver from his seat, raises at once all teeth and the harrow is instantaneously cleaned. As the driver is seated during the work, and is never obliged to alight, the work is easier and more efficient.

It is to be understood that the invention is not confined to the precise details of the present disclosure, but is susceptible of modifications and changes within its scope as hereinafter claimed.

I claim:

A harrow, comprising, in combination, a stationary axle; supporting wheels journaled on the ends thereof; a pair of stationary arms attached intermediate their ends to the opposite ends of the axle, said arms being inclined forwardly and downwardly and terminating at their front ends below said axle; a horizontal cross-bar supported at its ends in the front ends of said arms; a yoke pivoted at the free ends of its arms to the rear ends of said stationary arms; a series of tooth-carrying beams pivoted at their front ends to said cross-bar and extending rearwardly across and resting on the bight portion of said yoke to be supported thereby; a bell-crank operating lever including a rearwardly-extending lower arm; a fixed support for said lever whereon the same is pivoted at its apex; and an inverted yoke having its bight portion pivoted to the free end of said lever arm and its arms pivoted at their free ends to the bight portion of the first yoke.

In testimony whereof I affix my signature.

GEORGES AUGUSTE GEFFROY.